Figure 1:
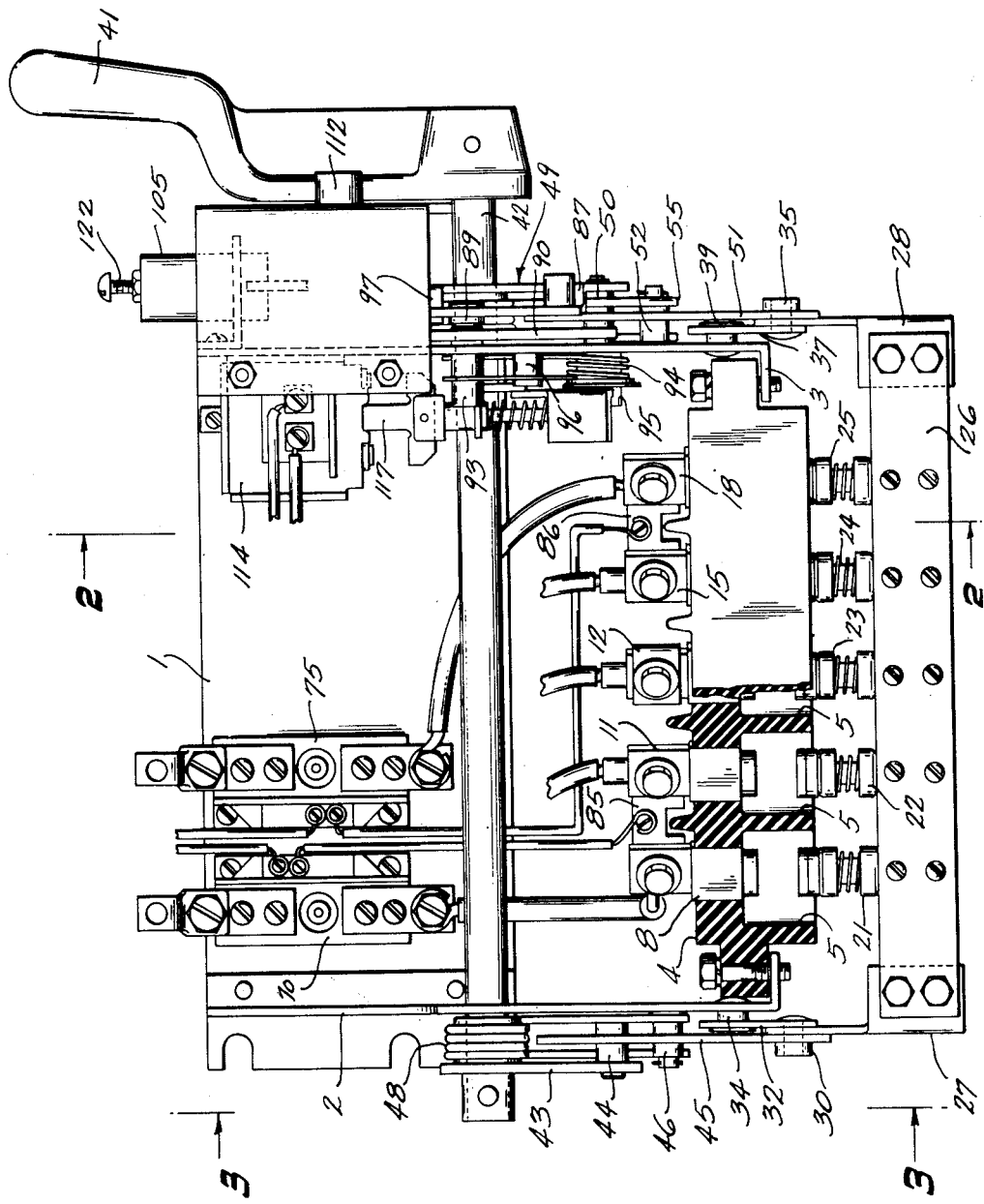

INVENTORS
Albert J. Dawe
Lynn H. Matthias
Woodrow A. De Smidt
BY
David G. Fox
Attorney

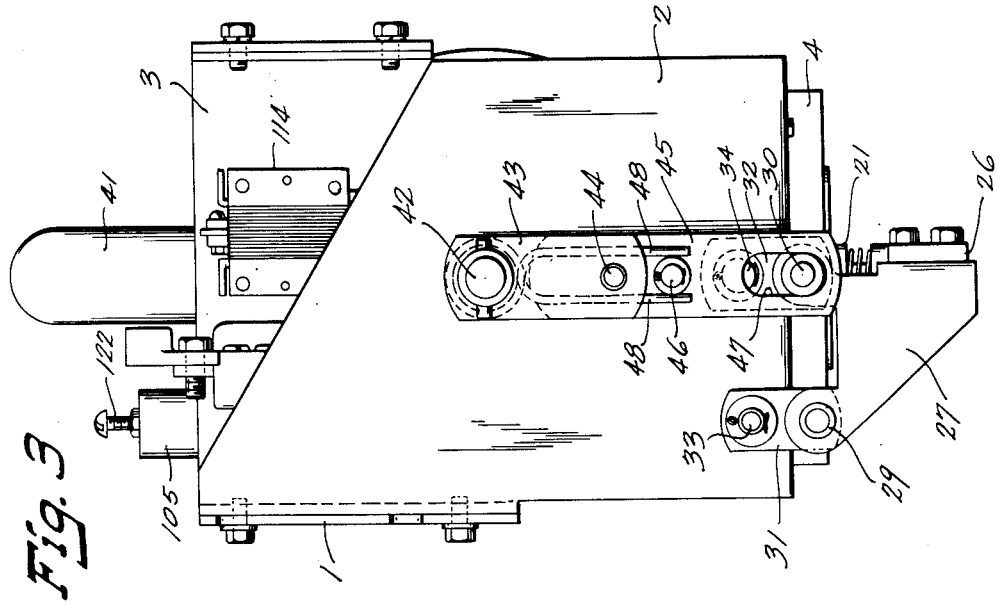
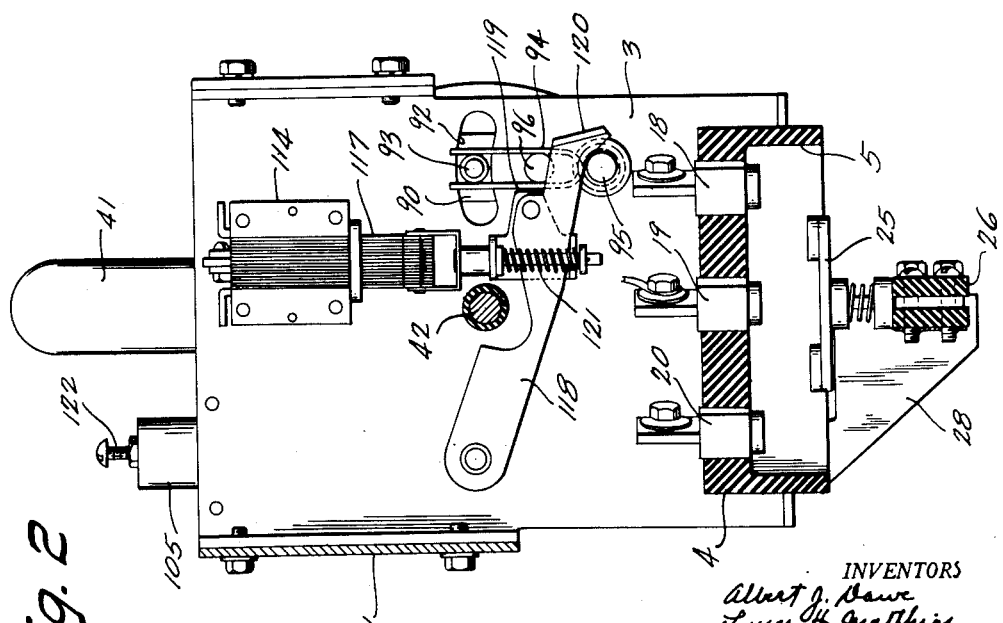

Feb. 23, 1954  A. J. DAWE ET AL  2,670,411
AUTOTRANSFORMER STARTER
Filed Nov. 28, 1949  6 Sheets-Sheet 3
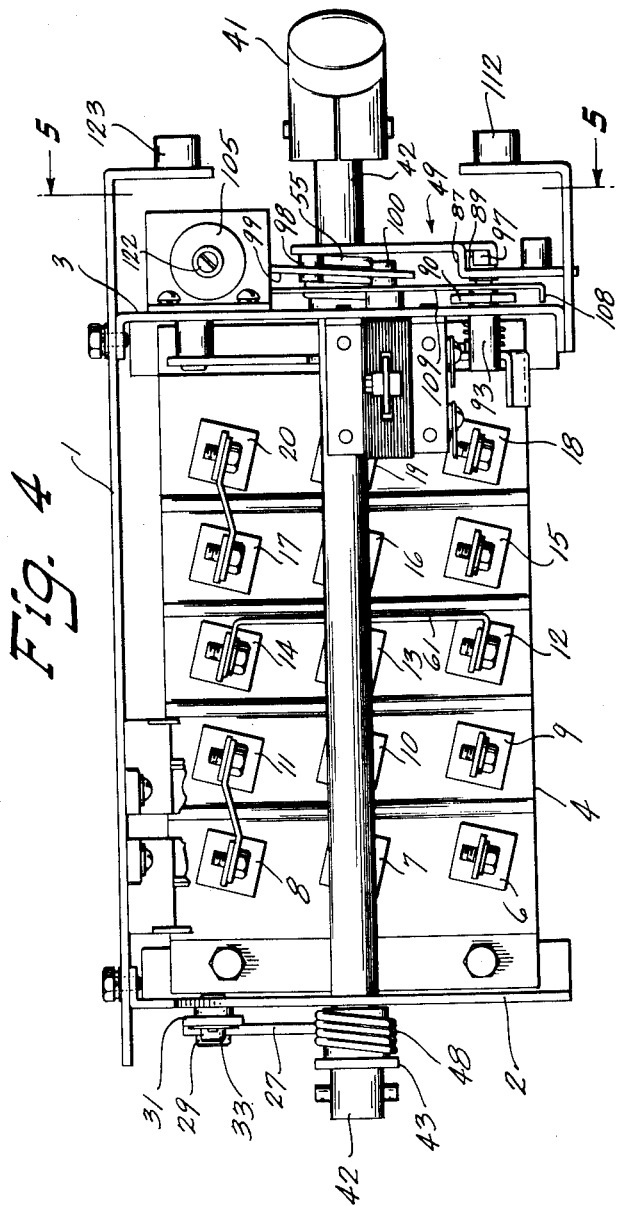
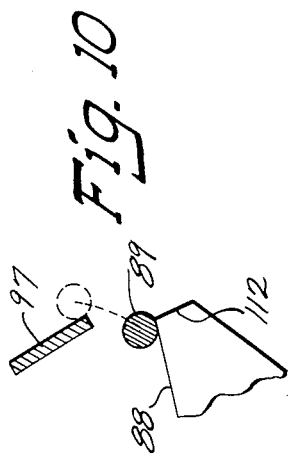
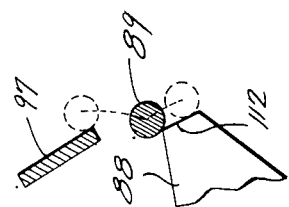
INVENTORS
Albert J. Dawe
Lynn H. Matthews
BY Woodrow G. DeSmidt
David G. Fox
Attorney

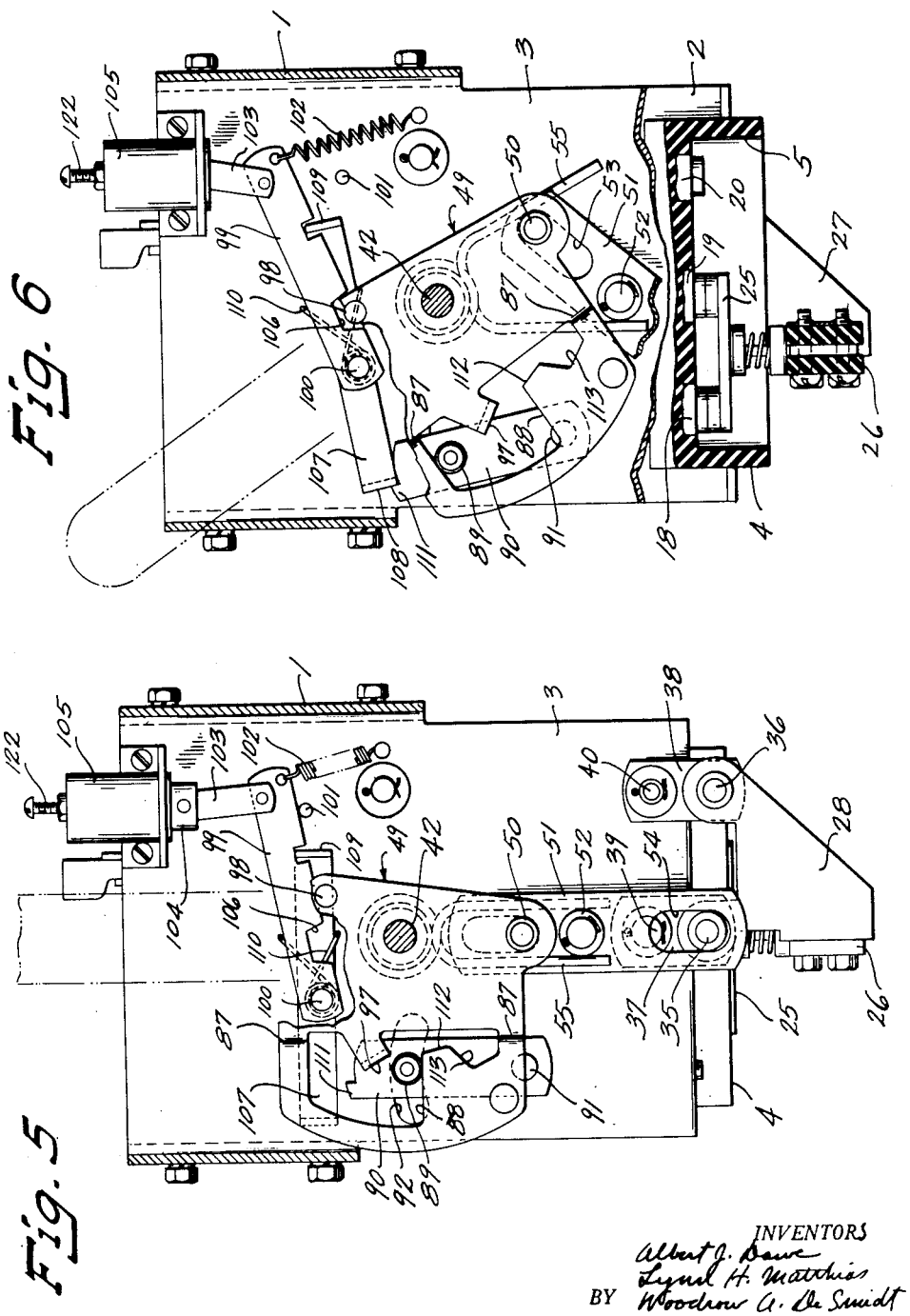

Feb. 23, 1954

A. J. DAWE ET AL 2,670,411

AUTOTRANSFORMER STARTER

Filed Nov. 28, 1949

6 Sheets-Sheet 5

INVENTORS
Albert J. Dawe
Lynn H. Matthias
BY Woodrow A. DeSmidt
David G. Fox
Attorney

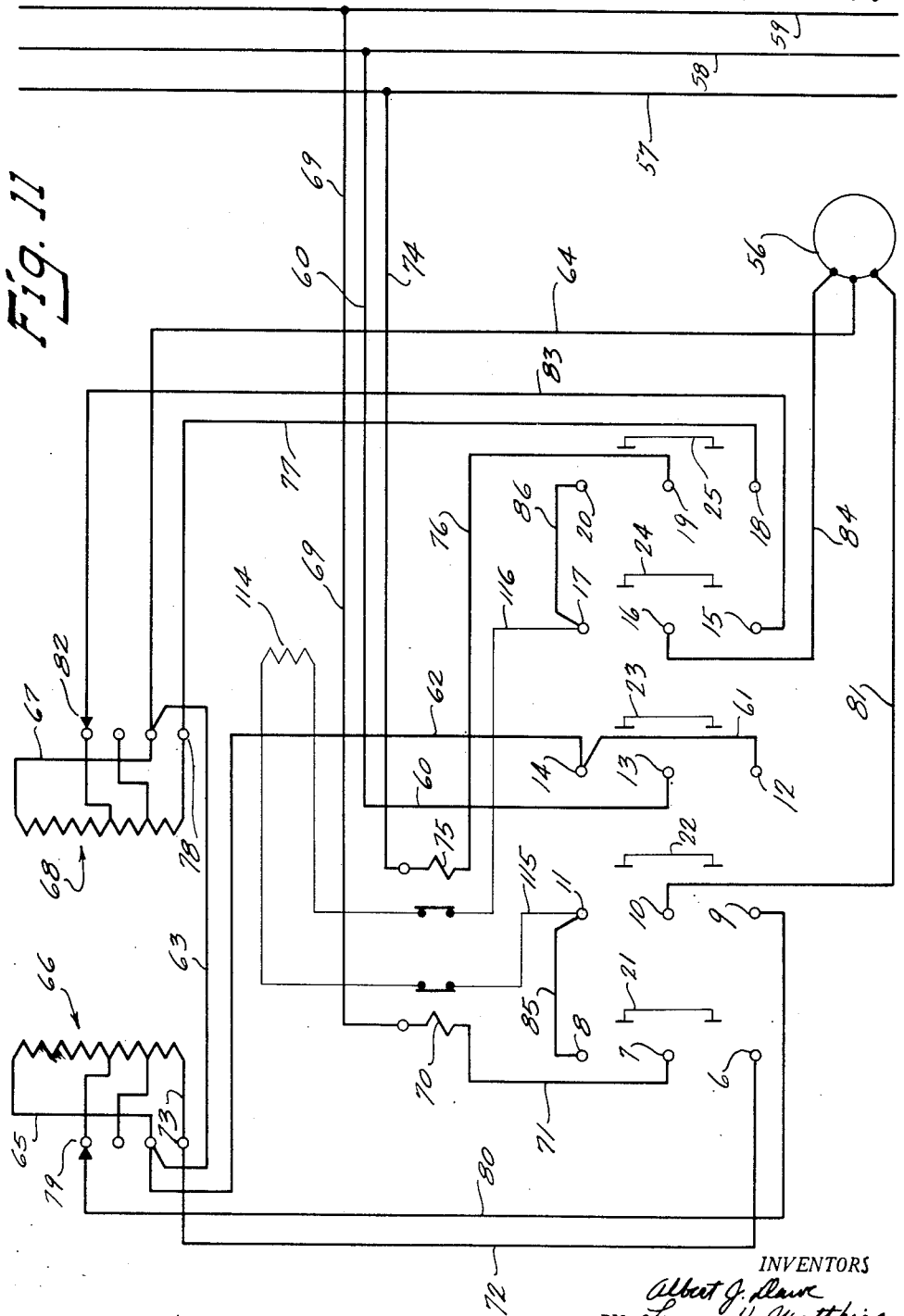

Patented Feb. 23, 1954

2,670,411

UNITED STATES PATENT OFFICE 2,670,411

AUTOTRANSFORMER STARTER

Albert J. Dawe, Milwaukee, Lynn H. Matthias, Fox Point, and Woodrow A. De Smidt, Whitefish Bay, Wis., assignors to Allen-Bradley Company, Milwaukee, Wis., a corporation of Wisconsin Application November 28, 1949, Serial No. 129,728

10 Claims. (Cl. 200—18)

1

This invention relates to manually operable electrical switches of the type primarily useful in connection with the starting of alternating current electric motors through apparatus which causes a reduction in voltage applied to the motor during acceleration, which switches, together with associated circuit elements, are sometimes referred to as compensator motor starters or auto-transformer motor starters; and it resides more specifically in an improved manually operable switch for use in connection with such circuits, in which novel means cause the movable contacts thereof to pursue a specialized path with respect to the stationary contacts and in which novel means are provided through which the user of the device is prohibited from any manipulation other than one which will cause the motor to be started with a minimum of electrical disturbance to the power lines.

One object of this invention is to provide a manually operable switching means of the class described which will effectively control circuits carrying substantial current, by causing the movable contacts to separate from the stationary contacts along a specialized path conducive to current interruption and to approach the stationary contacts along a path which will minimize welding and adhesion.

Another object of this invention is to provide a manually operable switch of the character described in which movable multiple break contacts which are electrically isolated from all live conducting circuit elements except when in contact with stationary contacts are employed but in which a minimum of stationary contacts and terminals is nevertheless employed.

Another object of this invention is to provide a manually operable switch of the character described in which the actuating mechanism, through novel means, requires a minimum predetermined dwell in starting position as a condition precedent to entrance into running position and in which transfer of the contacts to running position can be effected only with a rate of transfer in excess of a predetermined minimum.

Another object of the apparatus of this invention is to provide a switch of the character described which may be mounted either in air, or may be immersed in oil, as the case may require without any modification other than to provide or eliminate an oil bath.

Another object of the apparatus of this invention is to provide a manually operable switch in which novel means for causing the same to

2 move to open position under conditions of overload are provided.

The foregoing and other objects and advantages of this invention will become apparent from the description following which is set forth by reference to the accompanying drawings forming a part hereof and in which there is set forth by way of illustration and not of limitation one form in which the apparatus of this invention will be embodied.

Figure 8:
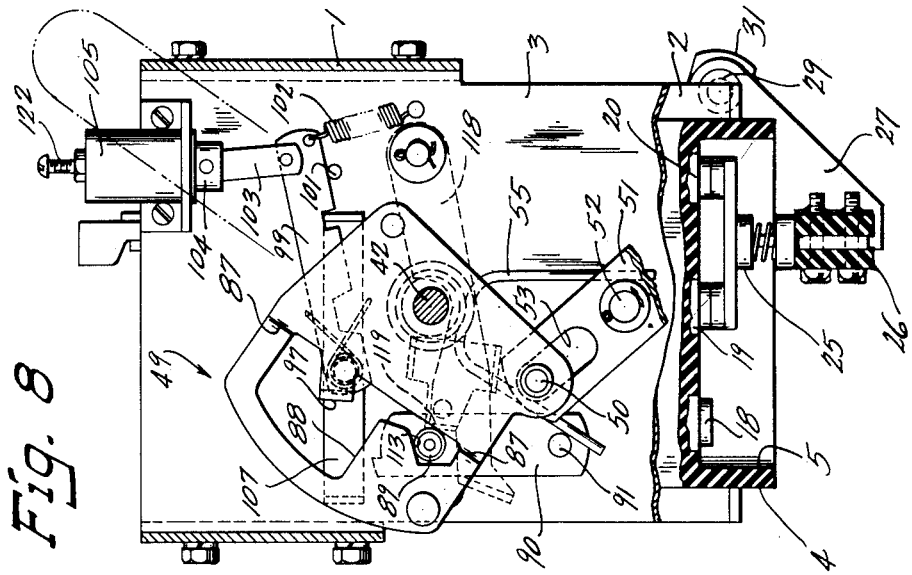
Figure 7:
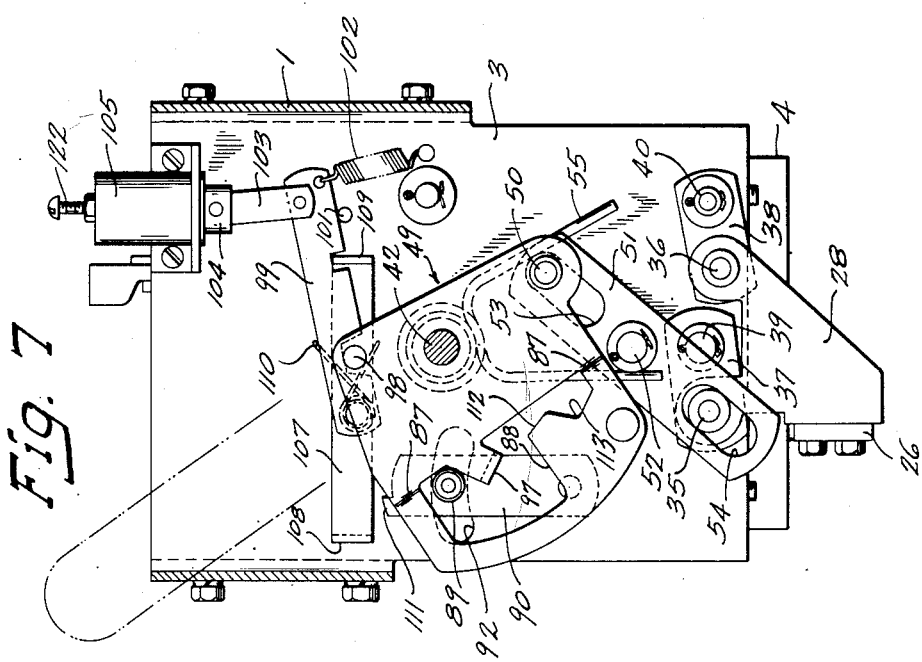

In the drawings,

Fig. 1 is a front view in elevation with parts broken away and in section of one form of a manually operable switch constructed in accordance with this invention, Fig. 2 is a left-hand end view in elevation and in section of the switch shown in Fig. 1 viewed through the plane 2—2 there indicated, Fig. 3 is a left-hand end view in elevation of the apparatus shown in Fig. 1 viewed as therein indicated at 3—3, Fig. 4 is a top plan view of the apparatus shown in Fig. 1, Fig. 5 is a right-hand end view in elevation and in section with parts broken away viewed through the plane 5—5 indicated in Fig. 4, Fig. 6 is a right-hand end view in elevation and in section with parts broken away and with the switch actuated to the initial or starting position viewed through the plane 5—5 indicated in Fig. 4, Fig. 7 is a right-hand end view in elevation and in section viewed through the plane 5—5 indicated in Fig. 4 showing the switch in initial or starting position after the minimum starting interval has elapsed, Fig. 8 is a right-hand end view in elevation and in section with parts broken away showing the switch in final or running position, the same being viewed through the plane 5—5 indicated in Fig. 4, Fig. 9 is a detail view in elevation and in section showing the parts involved in permitting transfer from starting to running position of the switch, Fig. 10 is a detail fragmentary view in section of the same parts shown in Fig. 9 but acting to prohibit transfer of the switch from starting to running position when such transfer is attempted at a rate less than a predetermined minimum rate, and Fig. 11 is a diagrammatical showing of one illustrative example of an electrical circuit which may be controlled by the switch of this invention.

The so-called compensator, auto-transformer or induction type of electric motor starter consists essentially of switching means which are arranged to connect a motor to be started first through an auto-transformer or other impedance device to the electric power lines so as to apply to the motor less than full line voltage and then after a predetermined interval during which acceleration takes place to connect the motor directly to the power lines. As such, the apparatus represents one means of complying with power company rules, which usually prohibit direct, across-the-line starting of motors whose capacity exceeds five horsepower. Various forms of switching means have been employed for this purpose and in many of them means are provided which permit movement of an operating handle, first, only into the starting position and, thereafter, into running position. Some of these apparatuses have also been constructed so as to preclude entrance into running position from starting position under any condition except one in which a predetermined dwell in starting position has theretofore taken place. In some of such apparatuses provision has also been made to prohibit other than a rapid transfer from starting to running position. Mechanism provided for accomplishing such functions, however, has been cumbersome and expensive and in many instances less than fully reliable. The switching structure per se for apparatus of this type heretofore in use has also been cumbersome in its space requirements and complex in structure requiring considerable maintenance.

The improved apparatus of this invention, as shown in one form in the drawings, achieves the objectives above referred to through improved means which are compact, comparatively simple and of increased reliability under prolonged service. As appears in the several figures of the drawings the apparatus of this invention is assembled upon a frame made up of a backplate 1 from which there projects in a forward direction a left-hand end plate 2 and a right-hand end plate 3.

The lower extremities of the end plates 2 and 3 are turned inwardly toward one another to furnish a mounting for an insulating stationary contact and terminal mounting block 4 which extends horizontally between the end plates 2 and 3 and is secured thereto by bolts as shown. The lower face of the terminal block 4 is recessed upwardly to form five transverse arc insulating pockets 5. Extending downwardly through the block 4 into the upper face of each pocket 5 is a set of three terminals which, starting with the left-hand pocket 5, are designated by numerals grouped as follows: in the first pocket 6, 7, 8; in the second pocket 9, 10, 11; in the third pocket 12, 13, 14; in the fourth pocket 15, 16, 17; and in the last pocket 18, 19, 20.

Each terminal mounted in the block 4 is provided with a downwardly facing stationary contact of appropriate alloy, the contacts in each set being arranged in alignment with one another and being equally spaced from one another. Mounted for movement within the pockets 5 in correlated relationship to the stationary contacts disposed therein are movable spring-backed bridge bar contact assemblies 21, 22, 23, 24 and 25. The movable contact assemblies 21 to 25 inclusive are secured to and carried by an insulating movable contact rack 26 composed of two rigid, facing bars of insulating material as shown. Each movable contact bridge bar assembly exposes upwardly a pair of movable contacts which are electrically joined and which are spaced from one another a distance equal to the spacing of the transverse spacing of the stationary contacts.

The ends of the movable contact rack 26 are engaged respectively by parallel motion hangers 27 and 28 to which it is securely bolted as shown. The hanger 27, as appears more particularly in Fig. 3, extends upwardly and rearwardly to provide spaced journals occupied by pivots 29 and 30 which are joined respectively with pendant parallel motion links 31 and 32 which are pivotally joined to the end plate 2 by pivots 33 and 34 as shown. Hanger 28 as appears more clearly in Fig. 7 and Fig. 5 is similarly formed, being provided with journals for pivots 35 and 36 which join with pendant links 37 and 38 which are joined in turn by pivots 39 and 40 with the end plate 3. The links 31, 32 and 37, 38 are of equal length and have a radius of action approximately equal to one half the spacing between the stationary contacts.

By reason of the parallelogram link arrangement above described, the hangers 27 and 28 and the movable contact assemblies borne thereby, are constrained to a circular path of motion while maintaining parallelism in attitude. Not only are the parts thus confined to a parallel motion, but by reason of the lengths of the links 31, 32 and 37, 38, the diameter of the circular path of motion is approximately equal to the spacing between the stationary contacts of any given group contained within a pocket 5. By reason of this relationship of parts, the movable contacts may assume an open position with relation to their respective stationary contacts such as is illustrated in Fig. 2, or they may occupy a closed position with respect to the mid-contact and the contact at the front of the switch (hereafter sometimes called the first position contact) as is illustrated in Fig. 6, or they may occupy a closed position with respect to the mid-contact and the stationary contact at the back of the switch (hereafter sometimes called the second position contact) as illustrated in Fig. 8.

For the purpose of bringing about movement of the movable contact assemblies to and from the three positions above detailed a movable hand lever 41 secured to an actuating shaft 42 rotatably mounted in journals in the end plates 2 and 3 is provided. At the left-hand end of the shaft 42 a downwardly extending crank arm 43 is secured thereto to rotate therewith. Crank arm 43 carries at its lower end extending toward the right a crank pin 44 which enters and slidingly engages a longitudinal slot, not shown, in a rocker arm 45 which is pivotally mounted upon a stationary pivot 46 secured to the end plate 2. The lower end of rocker arm 45, as shown in Fig. 3, is provided with a slot 47 which slidingly engages the pivot 30 which extends outwardly from the hanger 27 for that purpose.

A prestressed coiled spring 48 is mounted in position surrounding the shaft 42, with its two free ends extending downwardly to embrace the sides of stationary pivot 46 and in so doing to also embrace the crank pin 44. The prestressing of spring 48 is such as to cause the two lower ends thereof to be urged toward one another with substantial force thus normally urging the parts visible in Fig. 3 to the position therein shown.

At the right-hand end of the apparatus, as appears more clearly in Figs. 5 to 8 inclusive, there is rigidly secured to the shaft 42 to rotate therewith a cam plate generally designated by the numeral 49 to which a crank pin 50, which extends horizontally to the left therefrom is secured. Pin 50 in extending toward the left slidingly engages a slot 53 formed in the upper end of a rocker arm 51 pivotally carried upon a stationary pivot 52 mounted upon the end plate 3. The rocker arms 45 and 51 are similar in form and in dimension and the throw of crank pin 50 is equal to the throw of crank pin 44. The lower end of rocker arm 51 is provided with a slot which slidingly engages pivot 35 mounted on hanger 28.

Surrounding the shaft 42 adjacent the cam plate 49 is a coiled prestressed spring 55 of form similar to the spring 48. The lower free ends of spring 55 embrace the crank pin 50 and due to prestressing are urged toward one another to bear against the sides of fixed pivot 52. The spring 55 thus acts normally to urge the parts visible in Fig. 5 to the position therein shown. Upon displacement of the parts to either of the positions, represented for example by Figs. 6 and 7, the distortion of the spring 55 is such as to urge the parts to return to the position shown in Fig. 5.

The specialized configuration of cam plate 49, in conjunction with elements cooperatively related thereto, acts to constrain an operator utilizing the apparatus to a cycle of movement about to be described. Bearing in mind that when the hand lever 41 is pulled forwardly the movable contacts are brought to the position represented in Fig. 6 and when the operating hand lever 41 is pushed rearwardly the movable contacts are brought to the position shown in Fig. 8 the forward position of the hand lever 41 may be designated the first or starting position and the rearward position thereof the second or running position. With the hand lever 41 in vertical position the movable contacts assume the position illustrated in Fig. 2 and this position may be designated the mid-stop or open position.

In one mode of use, the apparatus of this invention may be connected in circuit, such as is illustrated in Fig. 11, wherein a motor 56 is arranged to be supplied with power from power lines 57, 58 and 59.

In the circuit shown in Fig. 11 power line 59 is connected by lead 60 with stationary contact 12. When movable contact assembly 23 is in starting position lead 60 is joined through stationary contact 12 jumper 61 and leads 62 and 63 with lead 64 which joins in turn with the center terminal of motor 56. At the same time power line 58 is connected to an end terminal 65 of auto-transformer 66 and end terminal 67 of auto-transformer 68.

Power line 59 is connected by a lead 69, time delay overload element 70 and a lead 71 with stationary contact 7. When the movable contact assembly 21 is moved to starting position it joins power line 59 electrically with the stationary contact 6 which is connected by a lead 72 with end terminal 73 of auto-transformer 66. The auto-transformer 66 is thus energized by the potential drop prevailing between power lines 58 and 59.

Power line 57 is connected by a lead 74, time delay overload element 75 and lead 76 with stationary contact 18. When the movable contact assembly 25 is moved to starting position it electrically joins power line 57 with stationary contact 18 which is joined in turn through lead 77 with end terminal 78 of auto-transformer 68. In this way auto-transformer 68 becomes energized by the potential drop prevailing between power lines 57 and 58.

Mid-tap 79 of auto-transformer 66 is joined by lead 80 with stationary contact 9 and when the movable contact assembly 22 is moved to starting position electrical connection is established between mid-tap 79 and lead 81 which joins with one of the end terminals of motor 56. In like manner mid-tap 82 of auto-transformer 68 is joined by lead 83 with stationary contact 15 and when movable contact assembly 24 is moved to starting position electrical connection is established between mid-tap 82 and lead 84 which joins with the remaining terminal of motor 56. In this way placement of the apparatus described in starting position energizes the motor 56 with power at a voltage less than that prevailing in the power lines.

When the movable contact assembly is moved to the running position, movable contacts 23 join power line 58 with the motor 56 as before by reason of the establishment of an electrical connection between stationary contacts 13 and 14. At the same time power line 59 is joined through lead 69, overload element 70, lead 71, contact 7, and movable contact assembly 21 with stationary contact 6 which is joined in turn through jumper 85 with stationary contact 11. Stationary contact 11 however is now engaged by movable contact assembly 22 and thus electrical connection is established through stationary contact 10 and lead 81 directly with a terminal of motor 56.

In similar fashion power line 57 is joined through lead 74, overload element 75, and lead 76 with stationary contact 19 and thus through movable contact assembly 25 with stationary contact 20 which is joined in turn through jumper 86 with stationary contact 17. Movable contact assembly 24, being in running position, electrically joins stationary contact 17 with stationary contact 16 which is joined in turn directly through lead 84 with the remaining terminal of motor 56. In this way full line voltage becomes applied to motor 56.

The predetermined sequence of first applying reduced voltage to the motor for a predetermined interval and thereafter applying full line voltage thereto requires that the switch be so constructed that the operator cannot push the hand lever 41 into running position from open or stop position but can only move the hand lever 41 from off into starting position. To this purpose cam plate 49 is provided with a forward extension which is offset toward the left as indicated at 87 and cut away with an opening of irregular outline which furnishes a blocking face 88. Positioned to be engaged by the blocking face 88 is a passing roller 89 mounted on and projecting laterally from the right side of a swinging passing arm 90. The swinging passing arm 90 is pivotally mounted on the end plate 3 by means of the pivot 91 and is free to operate within the limits of an arcuate slot 92 through which a latch pin 93 attached to swinging arm 90 extends. As appears more clearly in Fig. 2 arm 90 is urged to midposition by a prestressed centering spring 94 which is coiled about a mounting boss 95. Spring 94 is provided with two free ends which embrace a stationary guide pin 96 as well as the latch pin 93. By reason of prestress established in spring 94 the free ends thereof bear positively against the sides of the latch pin 93 and thus in cooperation with the guide pin 96 act to urge the swinging arm 90 to mid-position.

With the parts positioned as appears in Fig. 5, the blocking face 88, of cam plate 49, engages the roller 89 in a position substantially transverse to the path of movement which would occur were the cam plate 49 to be rotated in the clockwise direction. Since such mode of engagement is ineffective to impart any swinging component to the link or arm 90, clockwise rotation of the cam plate 49 is prohibited. As a result an operator is incapable of moving the hand lever 41 toward the running position when the parts are in the position illustrated in Fig. 5.

Movement of the hand lever 41 toward the starting position from the position shown in Fig. 5 is permitted by reason of the sloping engagement which takes place between the loading face of a passing cam finger 97, formed as a part of the cam plate 49 and the passing roller 89. The shank of the passing cam finger 97 extends from a part of the cam plate 49 which is not affected by the off-set 87 and is bent toward the left as appears more clearly in Fig. 1 so as to come into alignment with passing roller 89. The roller 89 may, however, occupy a position beneath the shank portion of the passing cam finger 97 when the need therefor arises as hereinafter more fully explained.

Shifting of the cam plate 49 in the counterclockwise direction, by movement of the hand lever 41 into the starting position, thus causes the swinging arm 90 to be likewise shifted in a counterclockwise direction. Simultaneously with this motion a time latch actuating abutment secured to the cam plate 49 and extending laterally toward the left therefrom is brought into engagement with a swinging timer loading arm 99 carried upon a fixed pivot 100. The time loader arm 99 is urged against a stop 101 by a return spring 102 and is joined by a connecting link 103 with the plunger 104 of a pneumatic dash pot 105. The dash pot 105 is provided with venting means permitting free escape of air when the plunger 104 is driven into the cylinder but which permits only a regulated readmission of air when the plunger 104 is being withdrawn from the cylinder, the latter being a well known construction and therefore not shown.

In rotating the cam plate 49 counterclockwise as thus described the abutment 98 first engages the timer actuating arm 99 forcing it upwardly and driving the plunger 104 into the dash pot 105. Upon further counterclockwise rotation of cam plate 49 the abutment 98 then moves on into a position under the notch 106 in the arm 99 leaving the arm 99 to return again under the influence of spring 102 at such rate as will be permitted by the dash pot 105.

Also positioned to swing about the fixed pivot 100 is a pivoted latch arm 107 having a bent back latching end 108 and a forwardly bent interference lug 109 at the opposite end. A coiled aligning spring surrounds the fixed pivot 100 and the free ends thereof are hooked respectively about the timer loader arm 99 and the latch arm 107. The aligning spring 110 is prestressed so as to cause the arms 99 and 107 to accompany one another as a unit (with the interference lug 109 in contact with the arm 99) but when the need arises to operate independently. Thus during counterclockwise rotation of cam plate 49 the latch projection 108 of the arm 107 becomes depressed in company with the loading of the dash pot 105 and is thus brought into latching contact with a latch projection 111 at the upper end of the swinging passing arm 90.

Actuation of the hand lever 41 to the limit of its movement in the starting direction brings the parts to the position shown in Fig. 6, further movement being arrested by the stop pin 112 and the swinging passing arm 90 is latched against return from its forward position. Under these conditions the operator may if he so desires return the operating lever 41 to off-position in which case the blocking face 88 by engaging the passing roller 89 precludes further clockwise rotation of the cam plate 49.

If the operator maintains the hand lever 41 in starting position as indicated in Fig. 7, for a predetermined interval monitored by the rate of descent of plunger 104 in dash pot 105, the parts then assume the position shown in Fig. 7 and the passing roller 89 acquires a new functional capability. If the operating lever 41 is now moved in clockwise rotation, the rear passing face of passing cam finger 97 engages the roller 89 so as to cause the passing arm 90 to be swung in clockwise rotation, while the roller 89 rides in engagement with the inner face of passing cam finger 97.

As the mid or off position of the operating lever 41 is approached the roller 89 reaches a point of departure from the finger 97 as represented by the upper dotted outline position appearing in Fig. 9. Further clockwise rotation of the cam plate 49 causes the roller 89 to completely depart from the cam finger 97. If, under such conditions, the rate of clockwise rotation of the cam plate 49 is in excess of a predetermined minimum, spring 94, acting upon arm 90, will have little opportunity to displace the arm 90 to an appreciable extent in the counterclockwise direction prior to the arrival, in the way of the roller 89, of a clearing tooth 112 formed as a part of the cam plate 49. With motion achieved as indicated in Fig. 9 successful passage from starting into running position may then continue as indicated by the dotted outline in the lower part of Fig. 9. Continued rotation of the cam plate 49 under the influence of the operating lever 41 can then be continued to a position illustrated in Fig. 8, whereupon the movable contact assembly is brought into engagement with those stationary contacts which act to complete the running circuit connections for the motor 56.

If the operator moves the operating lever 41 more leisurely from the starting toward the running position, spring 94 acting upon arm 90 throughout a greater interval without restraint, overcomes the inertia of the arm 90, with the result that roller 89 moves counterclockwise during passage of the transfer gap existing between the finger 97 and tooth 112, a sufficient amount to come into contact with blocking face 88 as illustrated in Fig. 10. When this occurs the operator finds the apparatus is stopped in open position, and he is positively precluded from continued motion toward running position. In this way establishment of full line voltage running connections with the motor after the motor has lost any appreciable part of its rotational velocity, induced during starting energization, is prevented.

Upon successful attainment of the running position of the parts, as illustrated in Fig. 8, the roller 89 becomes lodged within a running notch 113 formed in the cam plate 49 and simultaneously with the achieving of this position of parts the windings of a retaining magnet 114 become energized through leads 115 and 116 joined with stationary contacts 11 and 17. With magnet 114 energized the armature 117 thereof is drawn upwardly and through linkage connecting the same with a holding lever 118 the latter is drawn upwardly so as to present a latching abutment 119 thereof in interfering relationship to locking pin 93 which is secured as previously described to the swinging arm 99 and in consequence to the roller 89. The apparatus is thus rendered self maintaining in running position.

To cause the switch to move to open position pressure is applied to the stop button face 120 of the lever 118 which causes the spring 121 to become compressed while the interference of abutment 119 with locking pin 93 is removed thus causing the roller 89 to be cleared from the running notch 113. Thereupon the springs 48 and 55 return the switch parts to open position.

By reason of the inclusion of the time delay overload elements 70 and 75 in the circuit with the leads 115 and 116, supplying the holding magnet 114, excessive load prevailing in the motor 56 will cause the magnet 114 to become de-energized thus causing the armature 117 to drop and in so doing to release the arm 118 from its latching position whereupon the switch parts will assume open position. If desired the vent regulating screw 122 of the dash pot 105 may be adjusted so as to vary the interval during which the operator must maintain the operating lever 41 in starting position before attempting to transfer the parts to running position. In this way the switch may be adjusted to accord with the characteristics of different motors and to the load situation imposed thereon.

Through the employment of an appropriate alloy in the stationary and movable contacts such for example as well known silver-cadmium alloys or silver compositions containing compounds of cadmium and the like, an airbreak switch may be constructed in accordance with this invention capable of functioning satisfactorily and repeatedly over long periods of time handling substantial loads. If, however, additional capacity is desired provision may be made for immersing the contact elements in insulating oil by simply providing a suitable container for that purpose. Such immersion is feasible since all parts which would be affected in their operation by contact with the insulating oil are mounted above the electrical contact elements.

It is to be noted from the foregoing description that by reason of the parallel-attitude, circular motion of the movable contacts, the centrally disposed stationary contacts may be arranged to actively function both in connection with the starting circuit connections and the running circuit connetions of the motor. At the same time the economy and compactness achieved by thus employing the central stationary contacts nevertheless still permits double or multiple break interruption of all load carrying circuits. It will also be observed that the movable contacts approach and recede from the stationary contacts along paths which are nearly normal to the engagement faces of the contacts. Excessive wiping action is thus avoided on engagement minimizing the welding and sticking of contacts which sometimes occur upon closure. The perpendicular departure of the contacts upon opening in conjunction with the motion multiplying linkage between the shaft 42 and the movable contact assembly also assist in extinguishing arcing attendant upon opening of the switch.

We claim:

1. In a switch the combination comprising a plurality of longitudinally aligned sets of stationary contacts, each set including a central contact and first and second flanking contacts in transverse alignment, the spacings of said flanking contacts from said central contact being substantially equal, said stationary contacts having contact faces disposed in substantially a common stationary contact engagement face plane, a movable contact assembly for each set of stationary contacts including a pair of electrically joined movable bridging contacts spaced from one another a distance approximately equal to the spacing between said central contact and said flanking contacts, arcuate path transporting means at each end of said aligned sets of contacts including insulating means joining the same and cooperatively engaging and adapted to transport said movable contact assemblies along an arcuate path the chord of which is approximately equal to the spacing between said central contact and said flanking contacts, one terminus of said path being a position in which said movable contacts are in bridging electrical engagement with said central and said first flanking contacts and the other terminus being a position in which said movable contacts are in bridging electrical engagement with said central and said second flanking contacts, said arcuate path being in a plane intersecting said stationary contacts at substantially right angles to said stationary contact engagement face plane, an actuator including rotatable shaft means rotatably held in stationary bearings extending between and cooperatively engaging said transporting means to move the same to and from said first and second termini and to and from an intermediate open position between the same, and attitude preserving means cooperatively engaging said transporting means adapted to maintain said movable contact assembly and the engaging faces of the contacts thereof in attitudes substantially parallel to the said stationary contact engagement face plane, throughout the transporting movement thereof, whereby said movable contacts approach and depart from engagement with said stationary contacts along paths substantially normal to the engagement faces thereof without substantial wiping action.

2. A switch in accordance with claim 1 in which the arcuate path transporting means includes a swinging linkage whose effective swinging radius is approximately equal to one half the spacing between said central contact and said flanking contacts.

3. A switch in accordance with claim 1 in which said attitude preserving means includes a parallelogram linkage the effective radius of action of which is approximately equal to one half the spacing between said central contact and said flanking contacts.

4. In a switch having a movable contact assembly movable between a first terminus contact position and a second terminus contact position through a mid-open position, an actuator for said movable contact assembly including blocking means adapted to prohibit movement of said movable contact assembly from a standing condition in said mid-open position to said second terminus position, delay means operative to prohibit movement of said movable contact assembly toward said second terminus position from said first terminus position beyond said mid-open position prior to the elapse of a predetermined interval after movement of said movable contact assembly from said mid-open position to said first terminus position, passing means adapted to free said movable contact assembly for passage from said first terminus position to said second terminus position after a predetermined interval of time has elapsed, and slow transfer arresting means adapted to arrest the movement of said movable contact assembly in mid-open position when the same is moved from said first terminus position toward said second terminus position at a rate less than a predetermined rate after said passing means has freed said movable contact assembly for passage from said first to said second termini positions.

5. In an actuator for a switch having movable contacts of the class described including in combination a pivoted actuating lever movable to and from first and second termini positions and to mid-position; means associated with said lever for actuating the movable contacts; and motion controlling means associated with said lever comprising centering means adapted to urge said lever to said mid-position, oscillatable passing means oscillatable about a neutral position including centering means adapted to urge said passing means to said neutral position, blocking means including a blocking face movable in company with said lever and adapted to engage said passing means to prohibit motion of said lever toward said second terminus position, a passing cam movable in company with said lever having a passing face and a loading face adapted to engage said passing means and to move the same to a first loaded position on one side of its neutral position when said lever is moved from the mid-position to said first terminus position in which first loaded position said passing means remains effective to engage said blocking face, a time delay latch adapted to engage said passing means and to hold the same for a predetermined interval when the same is brought to said first loaded position by movement of said lever toward its first terminus position, the passing face of said passing cam being positioned to engage said passing means after release of the same by said latch upon movement of said lever from said first terminus position toward said second terminus position and to reverse load said passing means, a clearing face movable in company with said lever spaced from said passing face of said passing cam to provide a slow movement arresting gap accessible to said blocking face adapted to admit said passing means to said blocking face to arrest motion of said lever in mid-position when said lever is moved from said first terminus position toward said second terminus position at a rate less than a predetermined minimum rate but narrow enough to render said blocking face inaccessible to said passing means when said lever is moved at a rate in excess of said predetermined minimum, a holding face movable in company with said lever engageable by said passing means when said lever is in its second terminus position and releasable retaining means adapted to maintain said passing means in engagement with said holding face for retaining said lever in its second terminus position.

6. An actuator in accordance with claim 5 in which said blocking face, passing cam, slow movement arrest gap, clearing face and retaining face are formed as a part of a unitary cam plate secured to a pivotal shaft to which said actuating lever is secured.

7. An actuator in accordance with claim 6 in which said passing means includes a roller engageable with the several faces borne by said unitary cam plate.

8. An actuator in accordance with claim 5 in which said releasable retaining means comprises an electromagnet energized by arrival of said lever in said second terminus position said magnet being adapted when energized to maintain said passing means in engagement with said holding face.

9. An actuator in accordance with claim 5 in which said time delay latch includes a pneumatic dash pot loaded by movement of said lever toward its first terminus position to bring said latch to latching position and movable from loaded position at a regulated rate to displace said latch from latching position after a predetermined interval.

10. An actuator in accordance with claim 5 in which said passing member is a pivoted arm urged toward neutral position by a centering spring.

ALBERT J. DAWE.
LYNN H. MATTHIAS.
WOODROW A. DE SMIDT.

References Cited in the file of this patent
UNITED STATES PATENTS

| Number | Name | Date |
|---|---|---|
| 1,092,281 | McWilliams | Apr. 7, 1914 |
| 1,722,452 | Bollinger | July 30, 1929 |
| 1,893,046 | Austin | Jan. 3, 1933 |
| 2,513,649 | Jensen | July 4, 1950 |
| 2,547,153 | Caswell | Apr. 3, 1951 |